United States Patent
Yoshida et al.

(10) Patent No.: US 9,915,323 B2
(45) Date of Patent: Mar. 13, 2018

(54) TENSIONER

(71) Applicant: TSUBAKIMOTO CHAIN CO., Osaka, Osaka (JP)

(72) Inventors: Osamu Yoshida, Osaka (JP); Munehiro Maeda, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 143 days.

(21) Appl. No.: 14/922,784

(22) Filed: Oct. 26, 2015

(65) Prior Publication Data
US 2016/0123435 A1 May 5, 2016

(30) Foreign Application Priority Data

Oct. 29, 2014 (JP) .................................. 2014-220566

(51) Int. Cl.
*F16H 7/22* (2006.01)
*F16H 7/08* (2006.01)

(52) U.S. Cl.
CPC ........ *F16H 7/08* (2013.01); *F16H 2007/0812* (2013.01)

(58) Field of Classification Search
CPC ..... F16H 2007/0806; F16H 2007/0859; F16H 2007/0812; F16H 7/0848; F16H 7/0836
USPC ......................................................... 474/110
See application file for complete search history.

(56) References Cited

U.S. PATENT DOCUMENTS

| 2,893,255 | A | * | 7/1959 | Bayliss | ................. F16H 7/0848 188/196 R |
| 4,543,079 | A | * | 9/1985 | Matsuda | ............... F16H 7/0836 474/110 |
| 4,761,155 | A | * | 8/1988 | Kinoshita | ............... F02B 67/06 474/104 |

(Continued)

FOREIGN PATENT DOCUMENTS

JP 64-012955 U 1/1989
JP 2013-249939 A 12/2013

(Continued)

OTHER PUBLICATIONS

Office Action dated Jul. 18, 2017, issued in counterpart Chinese application No. 201510587413.9, with English translation. (11 pages).

(Continued)

*Primary Examiner* — Henry Y Liu
(74) *Attorney, Agent, or Firm* — Westerman, Hattori, Daniels & Adrian, LLP

(57) ABSTRACT

To provide a tensioner which can circulate a sufficient amount of oil even if there is a long time lag until pressurized oil starts to be supplied, and which exhibits a lower level of leak of oil stored therein, and which is structured simply without increasing the number of components therefore. The tensioner includes: a tensioner body having a plunger bore; a cylindrical plunger slidably inserted into the plunger bore; and biasing means for urging the plunger outward. When the tensioner is fixed to a wall surface, a body hole that extends from the wall surface up to a circumferential surface of the plunger bore is located lower than an oil discharge hole in the wall surface.

4 Claims, 2 Drawing Sheets

(56) References Cited

U.S. PATENT DOCUMENTS

| | | | | |
|---|---|---|---|---|
| 4,881,927 A * | 11/1989 | Suzuki | F16H 7/0848 | 474/110 |
| 4,963,121 A * | 10/1990 | Himura | F16H 7/08 | 474/110 |
| 5,090,946 A * | 2/1992 | Futami | F16H 7/08 | 474/104 |
| 5,193,498 A * | 3/1993 | Futami | F01L 1/02 | 123/90.31 |
| 5,352,159 A * | 10/1994 | Suzuki | F16H 7/08 | 474/110 |
| 5,441,457 A * | 8/1995 | Tsutsumi | F16H 7/08 | 474/110 |
| 5,601,505 A * | 2/1997 | Tada | F01L 1/02 | 474/110 |
| 5,606,941 A * | 3/1997 | Trzmiel | F01L 1/024 | 123/90.15 |
| 5,713,809 A * | 2/1998 | Yamamoto | F16H 7/0848 | 474/110 |
| 5,842,943 A * | 12/1998 | Tada | F16H 7/08 | 474/109 |
| 5,913,742 A * | 6/1999 | Nakamura | F16H 7/0848 | 474/110 |
| 5,954,159 A * | 9/1999 | Nakamura | F01L 1/02 | 184/11.2 |
| 5,967,921 A * | 10/1999 | Simpson | F16H 7/08 | 474/110 |
| 6,086,497 A * | 7/2000 | Fukuda | F16H 7/0836 | 474/101 |
| 6,196,939 B1 * | 3/2001 | Simpson | F16H 7/0848 | 474/101 |
| 6,471,612 B2 * | 10/2002 | Nakakubo | F16H 7/0836 | 474/109 |
| 6,866,601 B2 * | 3/2005 | Saitoh | F16H 7/0836 | 474/109 |
| 7,226,376 B2 * | 6/2007 | Konishi | F16H 7/0836 | 474/110 |
| 7,677,999 B2 * | 3/2010 | Sato | F16H 7/0848 | 474/109 |
| 7,699,730 B2 * | 4/2010 | Emizu | F16H 7/0836 | 474/110 |
| 7,918,754 B2 * | 4/2011 | Kurematsu | F16H 7/0848 | 474/110 |
| 8,523,720 B2 * | 9/2013 | Reinhart | F16H 7/0848 | 29/525.01 |
| 8,574,107 B2 * | 11/2013 | Nakano | F16H 7/0836 | 474/110 |
| 9,151,365 B2 * | 10/2015 | Oh | F16H 7/08 | |
| 2001/0007840 A1 * | 7/2001 | Nakakubo | F16H 7/0836 | 474/110 |
| 2001/0007841 A1 * | 7/2001 | Nakakubo | F16H 7/0836 | 474/110 |
| 2002/0065159 A1 * | 5/2002 | Markley | F16H 7/0848 | 474/110 |
| 2002/0098931 A1 * | 7/2002 | Kurohata | F16H 7/0836 | 474/109 |
| 2003/0186765 A1 * | 10/2003 | Konishi | F16H 7/0836 | 474/109 |
| 2003/0216202 A1 * | 11/2003 | Emizu | F16H 7/0836 | 474/109 |
| 2005/0014587 A1 * | 1/2005 | Konishi | F16H 7/0836 | 474/110 |
| 2005/0059517 A1 * | 3/2005 | Poiret | F01L 1/02 | 474/110 |
| 2005/0096166 A1 * | 5/2005 | Wakabayashi | F16H 7/0836 | 474/110 |
| 2006/0084538 A1 * | 4/2006 | Maino | F16H 7/0848 | 474/110 |
| 2006/0116229 A1 * | 6/2006 | Sato | F16H 7/0848 | 474/110 |
| 2008/0015069 A1 * | 1/2008 | Kroon | F16H 7/0836 | 474/110 |
| 2008/0248906 A1 * | 10/2008 | Ullein | F16H 7/0836 | 474/110 |
| 2009/0111628 A1 * | 4/2009 | Poiret | F16H 7/0848 | 474/110 |
| 2009/0197722 A1 * | 8/2009 | Emizu | F16H 7/0836 | 474/110 |
| 2011/0003657 A1 * | 1/2011 | Reinhart | F16H 7/0848 | 474/110 |
| 2011/0251001 A1 * | 10/2011 | Kobayashi | F16H 7/0848 | 474/110 |
| 2011/0256970 A1 * | 10/2011 | Nakano | F16H 7/0836 | 474/110 |
| 2012/0252615 A1 * | 10/2012 | Konuma | F16H 7/0848 | 474/110 |
| 2012/0322595 A1 * | 12/2012 | Kastner | F16H 7/08 | 474/110 |
| 2013/0324337 A1 * | 12/2013 | Yoshida | F16H 7/08 | 474/110 |
| 2014/0100068 A1 * | 4/2014 | Kurematsu | F16H 7/08 | 474/110 |
| 2014/0200104 A1 * | 7/2014 | Kurematsu | F16H 7/08 | 474/110 |
| 2015/0240918 A1 * | 8/2015 | Emizu | F01L 1/024 | 474/110 |
| 2015/0267789 A1 * | 9/2015 | Kurematsu | F16H 7/08 | 474/110 |
| 2015/0292602 A1 * | 10/2015 | Kurematsu | F16H 7/08 | 474/110 |
| 2015/0354673 A1 * | 12/2015 | Onoda | F16H 7/08 | 474/110 |
| 2016/0153530 A1 * | 6/2016 | Kitamura | F16H 7/08 | 474/110 |
| 2016/0186838 A1 * | 6/2016 | Kurematsu | F16H 7/08 | 474/110 |

FOREIGN PATENT DOCUMENTS

| | | |
|---|---|---|
| JP | 2014-77465 A | 5/2014 |
| JP | 2014-134263 A | 7/2014 |
| JP | 2014-159819 A | 9/2014 |

OTHER PUBLICATIONS

Office Action dated Aug. 2, 2017, issued in counterpart Korean application No. 2010-2015-0132280, with English translation. (11 pages).

* cited by examiner

TENSIONER

BACKGROUND OF THE INVENTION

1. Field of the Invention

The present invention relates to a tensioner including a tensioner body having a plunger bore whose one end is open, a cylindrical plunger slidably inserted into the plunger bore, and biasing means for urging the plunger outward, the tensioner being fixed to a wall surface that has an oil discharge hole.

2. Description of the Related Art

Regarding existing types of tensioner that have been widely used in a transmission device incorporated in a timing system or the like of an engine, a tensioner is used to apply appropriate tension to the slack side of a transmission belt or a transmission chain and reduce vibration during the drive. A tensioner is well known, which includes a tensioner body having a plunger bore whose one end is open, a cylindrical plunger slidably inserted into the plunger bore, and biasing means for urging the plunger outward, and which is fixed to a wall surface that has an oil discharge hole, moreover in which pressurized oil is supplied from the oil discharge hole, thereby achieving hydraulic damping effect, hydraulic drive force, and oil lubricating effect.

In such a tensioner, when the engine or the like is stopped and the pressurized oil is no longer supplied, the oil then flows out through a gap between the plunger bore and the plunger, or from an oil supply hole or the like that connects the plunger bore with the outside of the tensioner body, hence the oil remaining inside the tensioner is reduced.

When the engine is restarted in such a state, there is a time lag until the pressurized oil starts to be supplied again, so that rattling and clattering tend to occur because of the lack of hydraulic drive force and insufficient hydraulic damping effect. Also, sliding parts can readily be damaged due to reduced lubricating effect of oil.

Therefore, it is necessary to ensure that a sufficient amount of oil remains inside the tensioner during the period when there is no supply of pressurized oil.

Known structures that address these issues include a structure that allows additional oil to be stored outside the plunger bore, as shown in Japanese Patent Application Laid-open No. 2013-249939, for example, or a structure that can store an increased amount of oil in the plunger bore and inside the plunger, as shown in Japanese Patent Application Laid-open No. 2014-77465 or No. 2014-134263.

SUMMARY OF THE INVENTION

In these known tensioners, the problems mentioned above of the initial period when the engine is started can be resolved to some extent by keeping much oil in the reservoir part, plunger bore, and inside the plunger. However, if there is a long time lag until the pressurized oil starts to be supplied again when the engine is restarted, the stored oil is reduced, hence rattling and clattering tend to occur, as well as sliding parts could be damaged due to reduced lubricating effect of oil.

The tensioner shown in Japanese Patent Application Laid-open No. 2013-249939 has a body hole (oil supply passage 102) that extends from the wall surface up to a bottom part of the plunger bore, so that, when the engine is restarted, oil that was kept in a reservoir part (reserve chamber R) formed between the tensioner body and the wall surface is supplied from this body hole (oil supply passage 102).

However, the oil level in the reservoir part (reserve chamber R) keeps going down until the pressurized oil starts to be supplied after the engine is restarted, because the oil flows out through the gap between the plunger bore and the plunger with the reciprocating movements of the plunger (110). When the oil level in the reservoir part (reserve chamber R) goes down below the outlet 152 of the body hole (oil supply passage 102), no oil can be supplied any more into the tensioner.

Another problem was that the reservoir part (reserve chamber R) of a large volume had to be provided outside the plunger bore so as to keep much oil.

Moreover, a tight seal had to be provided between the wall surface and the tensioner body, because otherwise the oil in the reservoir part (reserve chamber R) would flow out during the period when the engine is stopped for a long time.

In the tensioners shown in Japanese Patent Application Laid-open Nos. 2014-77465 and 2014-134263, the amount of oil flowing out through the gap between the plunger bore (111) and the plunger (120) with the reciprocating movements of the plunger when restarted is reduced, and oil circulation in the plunger bore (111) and inside the plunger (120) is facilitated. However, part of the circulating oil flows out from the body hole (oil supply hole 114) to the outside of the plunger bore (111), so that, when there is a long time lag until pressurized oil starts to be supplied, a sufficient amount of oil could not be retained inside the tensioner.

Moreover, the tensioners shown in Japanese Patent Application Laid-open Nos. 2014-77465 and 2014-134263 use an increased number of components and complex structures in order to keep more oil in the plunger bore (111) and inside the plunger (120) and to cause more oil to be circulated inside.

The present invention resolves these problems and it is an object of the invention to provide a tensioner that can circulate a sufficient amount of oil even if there is a long time lag until pressurized oil starts to be supplied by causing less oil stored inside to flow out, with a simple structure and without increasing the number of components.

The tensioner according to the present invention includes: a tensioner body having a plunger bore whose one end is open, a cylindrical plunger slidably inserted into the plunger bore; and biasing means for urging the plunger outward, the tensioner being fixed to a wall surface that has an oil discharge hole, wherein the tensioner body has a body hole extending from a wall surface side up to a circumferential surface of the plunger bore, and the body hole is located lower than the oil discharge hole when the tensioner is fixed to the wall surface, whereby the problems described above are solved.

According to the tensioner set forth in claim 1, the body hole is located lower than the oil discharge hole when the tensioner is fixed to the wall surface. This way, the amount of oil flowing past the body hole and reversely into the oil discharge hole with the reciprocating movements of the plunger when the engine is restarted can be reduced without increasing the number of components and with a simple structure.

Thus, less of the oil kept inside flows out, and more oil is circulated inside, so that, even when there is a long time lag until the pressurized oil starts to be supplied, a sufficient amount of oil can be secured, whereby the damping effect of oil can be achieved sufficiently and rattling and clattering are reduced, as well as damage to sliding parts can be prevented because the lubricating effect of oil is maintained.

According to the configuration set forth in claim 2, the oil supply passage between the oil discharge hole and the body hole does not include an oil reservoir space. This way, even if all the oil in the oil supply passage has flown out during a prolonged stop, the oil does not flow reversely into the oil discharge hole when the engine is restarted and the plunger reciprocates, although the oil may flow past the body hole, and also, no oil remains in the oil supply passage.

This causes more oil to be circulated inside, so that a sufficient amount of oil can be secured even if there is a long time lag before the start of supply of pressurized oil.

According to the configuration set forth in claim 3, the plunger hole is located always lower than the body hole when the tensioner is fixed to the wall surface. This way, more of the oil flowing in the internal recess with the reciprocating movements of the plunger when the engine is restarted can be recovered into the plunger from the plunger hole before the oil reaches the body hole, which causes even more oil to be circulated inside.

According to the configuration set forth in claim 4, the plunger hole is located higher than a region of a horizontal projected image of the plunger bore on the wall surface, and communicated with the internal oil passage, when the tensioner is fixed to the wall surface. This way, the traveling distance of the oil from the internal recess to the body hole with the reciprocating movements of the plunger when the engine is restarted can be made longer, which causes even more oil to be circulated inside.

DESCRIPTION OF THE PREFERRED EMBODIMENTS

The tensioner of the present invention may be embodied in any specific configuration as long as it includes: a tensioner body having a plunger bore whose one end is open; a cylindrical plunger slidably inserted into the plunger bore; and biasing means for urging the plunger outward, the tensioner being fixed to a wall surface that has an oil discharge hole, wherein the tensioner body has a body hole extending from a wall surface side up to a circumferential surface of the plunger bore, and the body hole is located lower than the oil discharge hole when the tensioner is fixed to the wall surface, whereby, the tensioner can circulate a sufficient amount of oil even if there is a long time lag until pressurized oil starts to be supplied, and exhibits a lower level of leak of oil stored therein, and is structured simply without increasing the number of components therefore.

First, the present invention will be generally described with reference to FIG. 1 and FIG. 2.

Figure 1:
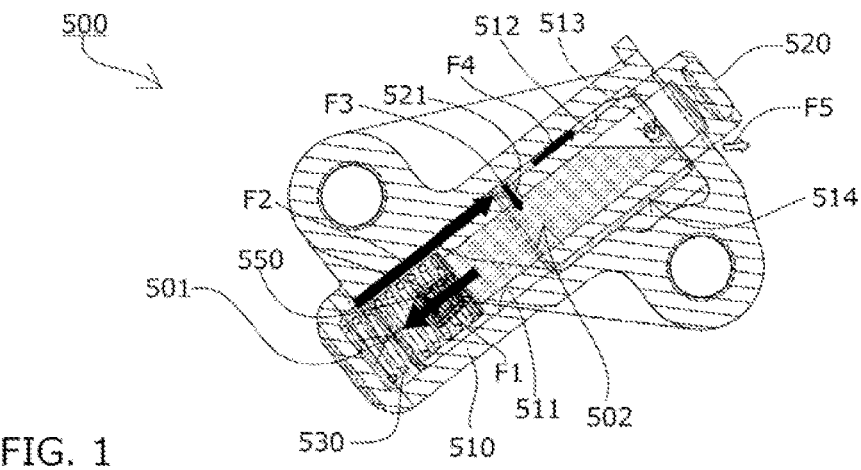
FIG. 1 is a diagram for explaining the flow of oil in the tensioner when started.

The tensioner 500 includes, as shown in FIG. 1, a tensioner body 510 having: a cylindrical plunger bore 511 whose one end is open; a cylindrical plunger 520 slidably inserted into the plunger bore 511; and a coil spring 530 that is biasing means accommodated inside an oil pressure chamber 501 formed between the plunger bore 511 and the rear end of the plunger 520 such as to be able to expand and contract and to urge the plunger 520 outward.

The plunger 520 is urged to protrude diagonally upward when the tensioner body 510 is fixedly attached to a wall surface (not shown in FIG. 1) inside an engine.

An internal recess 512 is formed in the inner circumference of the plunger bore 511 of the tensioner body 510, to configure an internal oil passage 514 between the internal recess 512 and the outer circumferential surface of the plunger 520.

The tensioner body 510 is fixedly attached to a wall surface (not shown in FIG. 1) inside the engine when used, and provided with a body hole 513 that extends through the body from the wall surface to the internal oil passage 514.

The plunger 520 has a check valve 550 arranged inside. An oil reservoir chamber 502 is formed in the plunger on the protruding side, with a plunger hole 521 being provided for connecting the internal oil passage 514 with the oil reservoir chamber 502.

In this tensioner 500, after the engine is stopped, the oil supply stops. The oil inside the tensioner 500 then flows out gradually, as shown in FIG. 1 (arrow F5), from the protruding end of the plunger through a gap between the plunger bore 511 and the plunger 520, and stays inside the oil reservoir chamber 502.

When the engine is restarted in this state, the oil inside the oil reservoir chamber 502 is circulated by the reciprocating movements of the plunger 520 until the supply of pressurized oil is started.

The oil inside the oil reservoir chamber 502 moves into the oil pressure chamber 501 through the check valve 550 (F1), travels from the oil pressure chamber 501 through the gap between the plunger bore 511 and the plunger 520 into the internal oil passage 514 (F2), and flows back to the oil reservoir chamber 502 from the internal oil passage 514 through the plunger hole 521 (F3).

Some of the oil at this time flows further upward from the internal oil passage 514 (F4) and is returned toward the wall surface through the body hole 513.

The amount of oil that travels upward from the internal oil passage 514 and flows out from the protruding end of the plunger through a gap between the plunger bore 511 and the plunger 520 (F5) can be made extremely small by optimally setting the layout of the plunger hole 521, body hole 513, and internal oil passage 514 in a known manner.

The flow of oil that is returned through the body hole toward the wall surface will be explained with reference to FIG. 2A to FIG. 2F.

Figure 2A:
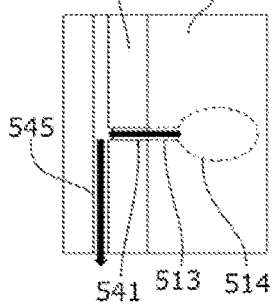
FIG. 2A to FIG. 2F are diagrams for explaining the flow of oil from the body hole to the oil discharge hole when started.

In a known tensioner in which there is no oil reservoir space between the wall surface and the tensioner body, the oil that travels upward from the internal oil passage 514 and is returned to the wall surface side through the body hole 513 flows reversely through the oil discharge hole 541 directly opposite the body hole 513 and flows out through an oil pipe 545 in the engine, as shown in FIG. 2A.

Therefore, the oil stored inside the tensioner reduces gradually as the plunger reciprocates until the pressurized oil starts to be supplied again. If there is a long time lag until the supply of pressurized oil is started, rattling and clattering tend to occur, and sliding parts could be damaged due to reduced lubricating effect of oil.

Figure 2B:
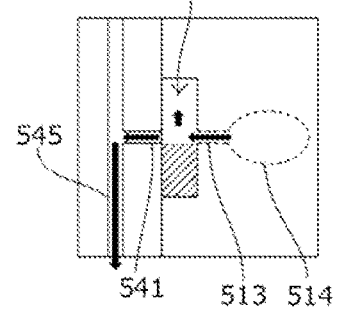

In the known tensioner with an oil reservoir space 517, as shown in FIG. 2B, the oil that travels upward from the internal oil passage 514 and is returned to the wall surface side through the body hole 513 flows into the oil reservoir space 517, hence the oil level therein rises. Since the oil is sucked back into the body hole 513 in short cycles by the reciprocating movements of the plunger, the amount of oil flowing reversely into the oil discharge hole 541 is somewhat reduced. Most of the oil, however, flows reversely through the oil discharge hole 541 and flows out through the oil pipe 545 on the engine side.

Figure 2C:
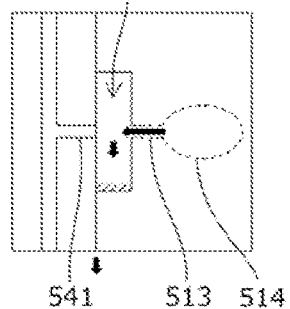

When the engine is stopped for a long time, the oil level in the oil reservoir space 517 lowers as the oil flows out through the gap between the wall surface 540 and the tensioner body 510 as shown in FIG. 2C. Eventually, all the oil in the oil reservoir space 517 flows out.

When restarted in this state, no oil is sucked into the body hole 513 by the reciprocating movements of the plunger until oil that travels upward from the internal oil passage 514 and is returned to the wall surface side through the body hole 513 fills the oil reservoir space 517 up to the level of the body hole 513. Hence, the volume of oil stored inside the tensioner is gradually reduced to a volume that can be accommodated in the oil reservoir space 517.

Figure 2D:
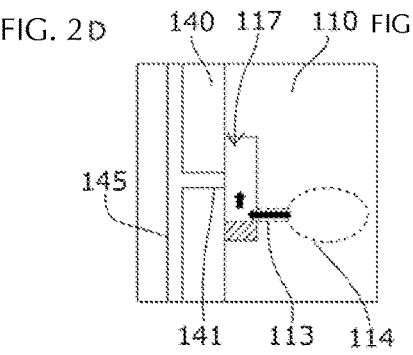
Figure 2E:
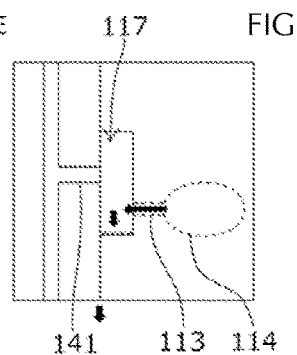
Figure 2F:
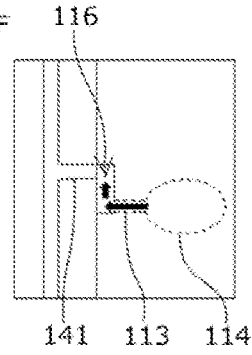

In contrast, in the tensioner of the present invention, as shown in FIG. 2D to FIG. 2F, the body hole 113 is located lower than the oil discharge hole 141 when the tensioner is fixed to the wall surface 140.

If there is provided an oil reservoir space 117 in the tensioner of the present invention, as shown in FIG. 2D, the oil that travels upward from the internal oil passage 114 and is returned to the wall surface side through the body hole 113 flows into the oil reservoir space 117. As the oil level there rises, the oil is sucked back into the body hole 113 in short cycles by the reciprocating movements of the plunger.

Since the oil discharge hole 141 is located higher than the oil level, and since the oil is repeatedly expelled from and sucked into the body hole 113 in short cycles, the oil level never reaches the oil discharge hole 141, so that the oil does not flow reversely out from the oil discharge hole 141. Therefore, even when there is a long time lag until the supply of pressurized oil is started, the oil stored inside the tensioner is not reduced, as the oil does not flow reversely out of the oil discharge hole 141.

When the engine is stopped for a long time, similarly to the known tensioner, the oil level in the oil reservoir space 117 lowers as the oil flows out through the gap between the wall surface 140 and the tensioner body 110 as shown in FIG. 2E. Eventually, all the oil in the oil reservoir space 117 flows out.

Even so, because the body hole 113 is located lower, it takes a smaller amount of oil for the oil level in the oil reservoir space 117 to reach the body hole 113, as compared to the known tensioner, so that the amount of loss of the oil stored inside the tensioner is reduced.

In order to further reduce the oil loss, it is desirable to make the volume below the body hole 113 in the oil reservoir space 117 as small as possible.

According to the tensioner of the present invention, it is also possible to provide only an oil supply passage 116 instead of the oil reservoir space, as shown in FIG. 2F.

In this case, the oil that travels upward from the internal oil passage 114 and is returned to the wall surface side through the body hole 113 moves up the oil supply passage 116 toward the oil discharge hole 141, but never reaches this hole because the oil is sucked back into the body hole 113 by the reciprocating movements of the plunger in short cycles, and therefore the oil stored inside the tensioner is not reduced, as the oil does not flow reversely out of the oil discharge hole 141.

Since there is no oil reservoir space, the volume below the body hole 113 is almost zero, and thus the problem of oil loss from the reservoir in the tensioner after a restart because of the reduction in the oil level in the reservoir space during the period when the engine is stopped, as shown by the example of FIG. 2E described above, can be resolved.

Embodiment

Figure 3:
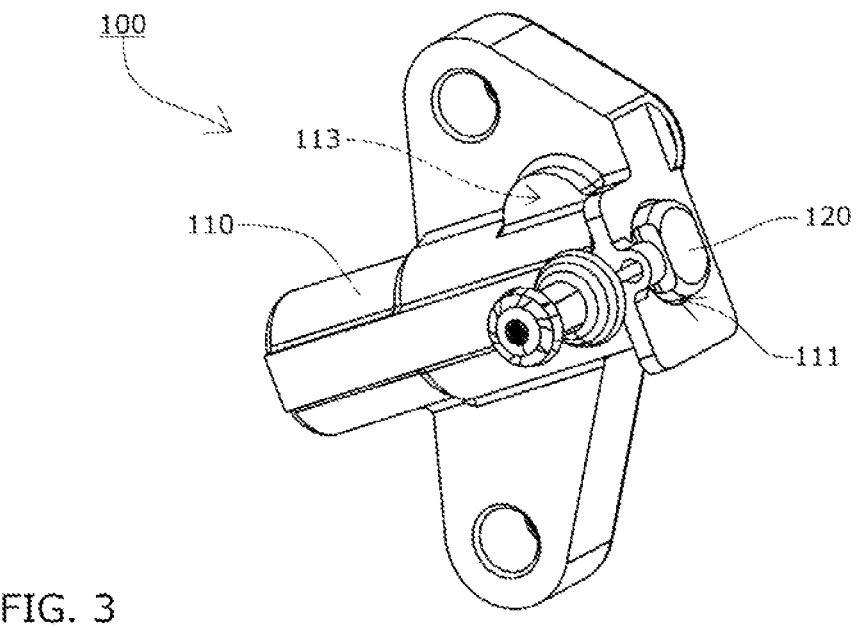
FIG. 3 is a perspective view of a tensioner according to one embodiment of the present invention.
Figure 4:
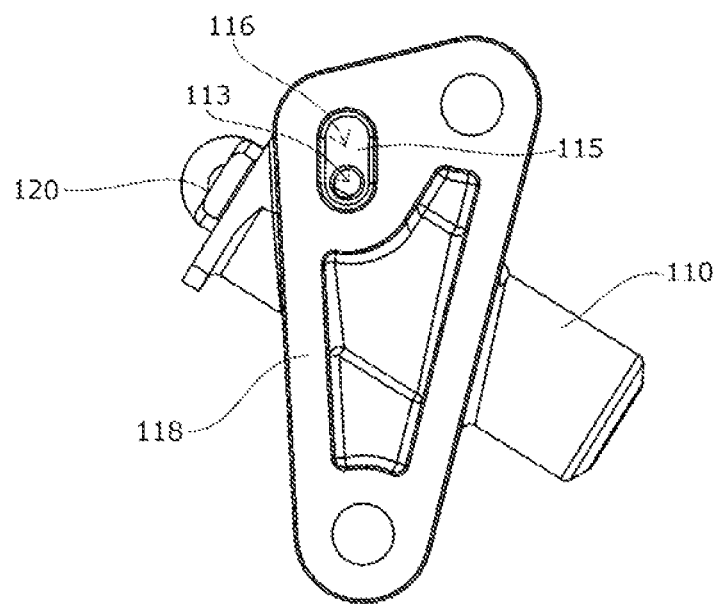
FIG. 4 is a backside view of the tensioner according to one embodiment of the present invention.

The tensioner 100 according to one embodiment of the present invention includes, as shown in FIG. 3 and FIG. 4, a tensioner body 110 having: a cylindrical plunger bore 111 whose one end is open; a cylindrical plunger 120 slidably inserted into the plunger bore 111; and a coil spring that is biasing means accommodated inside an oil pressure chamber formed between the plunger bore 111 and the rear end of the plunger 120 such as to be able to expand and contract and to urge the plunger outward.

The structures of the inside of the tensioner body 110 and the plunger 120 are the same as those of the previously described tensioner 500 except for the position of the body hole 113.

The body hole 113 is located higher than a region of a horizontal projected image of the plunger bore 111 on the wall surface, and communicated with the internal oil passage formed by the inner recess in the inner circumference of the plunger bore 111.

The end on the attachment surface 118 side of the body hole 113 opens inside the supply recess 115, as shown in FIG. 4.

With the tensioner 100 fixedly attached to the wall surface (as oriented in the vertical direction as shown in FIG. 4), the supply recess 115 extends upward from the body hole 113 that is at the bottom of the recess to form the oil supply passage 116, at the upper end of which the oil discharge hole will be located in the wall surface.

The body hole 113 may be located in the similar position as that of the previously described tensioner 500, or any other positions when the tensioner is fixed to the wall surface, as long as a sufficient and necessary amount of oil can be kept inside the oil reservoir chamber during the engine is stopped.

With the tensioner 100 according to this embodiment, the body hole 113 is located near the protruding end of the plunger 120 in the plunger bore 111 and above a region of a horizontal projected image of the plunger bore 111 on the wall surface, so that the amount of oil that reaches the body hole 113 when the oil circulates inside the tensioner by the reciprocating movements of the plunger 120 until the pressurized oil starts to be supplied is reduced, whereby more oil can be circulated inside the tensioner.

The supply recess 115 may be configured such as to form a reservoir space as described above with reference to FIG. 2D and FIG. 2E.

A supply recess may also be formed in the wall surface to form the oil supply passage 116, or a reservoir space. Alternatively, the supply recess may be formed only in the wall surface.

While specific examples of the tensioner according to the present invention have been described in the embodiment above, the tensioner according to the present invention is not limited to these, and, for example, the shapes, positions, sizes, and positional relationships with each other of various constituent parts may be changed in various manners, or variously combined as required.

The tensioner may not necessarily be applied to the timing system of an engine but may also be applied to transmission mechanisms that have similar problems, and can be used in a variety of industrial fields.

What is claimed is:

1. A tensioner comprising:
a tensioner body having a plunger bore whose one end is open;
a cylindrical plunger slidably inserted into said plunger bore; and
biasing means for urging said plunger outward, the tensioner being fixed to a vertical wall surface that has an oil discharge hole,
wherein said tensioner body includes a body hole extending from a wall surface side up to a circumferential surface of said plunger bore,
wherein said body hole is located lower than said oil discharge hole when the tensioner is fixed to said vertical wall surface,
wherein said plunger includes a plunger hole that extends from an outer circumferential surface thereof through to inside thereof,
wherein an internal recess is formed in at least one of an inner circumferential surface of said plunger bore and said outer circumferential surface of the plunger to form an internal oil passage which directly connects said body hole to said plunger hole,
wherein said plunger has a check valve arranged inside,
wherein an oil reservoir chamber is formed in said plunger on the protruding side, and
wherein said plunger hole is provided for connecting said internal oil passage with said oil reservoir chamber.

2. The tensioner according to claim 1,
wherein a supply recess is formed to at least one of said vertical wall surface and said tensioner body for forming an oil supply passage between said oil discharge hole and said body hole, and
wherein the oil supply passage formed by said supply recess does not have a space for storing oil.

3. The tensioner according to claim 1,
wherein said plunger hole is located always lower than said body hole when the tensioner is fixed to said vertical wall surface.

4. The tensioner according to claim 3, wherein said supply recess is located higher than a region of a horizontal projected image of said plunger bore on said vertical wall surface, and connected to said internal oil passage, when the tensioner is fixed to said wall surface.

* * * * *